United States Patent [19]

Rose et al.

[11] Patent Number: 5,367,244

[45] Date of Patent: Nov. 22, 1994

[54] BATTERY CHARGING METHOD WITH STEPPED CURRENT PROFILE AND ASSOCIATED CHARGER

[75] Inventors: Stephen D. Rose, Irvine; Joseph A. Cates, Lexington, both of Ky.; Jeffrey A. Rose, La Jolla, Calif.

[73] Assignee: Premier Engineered Products, Inc., Winchester, Ky.

[21] Appl. No.: 5,632

[22] Filed: Jan. 19, 1993

[51] Int. Cl.$^5$ ............................................... H02J 7/04
[52] U.S. Cl. ........................................ 320/23; 320/31; 320/39
[58] Field of Search ................... 320/5, 14, 22, 23, 24, 320/31, 32, 39, 40

[56] References Cited

U.S. PATENT DOCUMENTS

| | | | |
|---|---|---|---|
| 3,614,582 | 10/1971 | Burkett | 320/5 |
| 3,732,481 | 5/1973 | Mas | 320/14 |
| 3,979,658 | 9/1976 | Foster | 320/23 |
| 3,992,658 | 11/1976 | Bechtold et al. | 320/20 |
| 4,016,473 | 4/1977 | Newman | 320/14 |
| 4,019,111 | 4/1977 | Bennefeld | 320/23 |
| 4,052,656 | 10/1977 | Lavell et al. | 320/23 |
| 4,146,830 | 10/1978 | Foster | 320/23 |
| 4,609,861 | 9/1986 | Inaniwa et al. | 320/32 |
| 4,629,965 | 12/1986 | Fallon et al. | 320/39 |
| 4,740,739 | 4/1988 | Quammen et al. | 320/14 |
| 4,871,959 | 10/1989 | Gali | 320/61 |
| 4,952,861 | 8/1990 | Horn | 320/23 |

FOREIGN PATENT DOCUMENTS 1326335 8/1973 United Kingdom .

*Primary Examiner*—Kristine L. Peckman
*Attorney, Agent, or Firm*—King and Schickli

[57] ABSTRACT

A method and apparatus is provided to charge a battery including a DC charge current supply having a variable output. The charging current is varied in accordance with several sensed parameters in the circuit so that battery voltage is accurately controlled. Initially, constant charging current is applied, and upon detecting that battery voltage increases to the gassing voltage, an incremental step reduction in charging current is triggered. The step reduction causes a decrease in battery voltage, dropping it below the gassing voltage. The step reduced charging current is then applied to increase battery voltage back up to the gassing voltage, thereby triggering another step reduction in charging current. This process is repeated multiple times providing a stepped current profile, i.e., each battery voltage increase to the gassing voltage triggering a step reduction in charging current, and in turn a corresponding voltage reduction. The battery voltage, with the alternating increases and decreases, is thus defined by a saw-tooth profile with peaks at the gassing voltage. When the charging current is finally reduced to a minimum level, the sensed battery voltage triggers a termination of the stepped current reduction. Upon the battery reaching full charge, the application of charging current is terminated.

19 Claims, 2 Drawing Sheets

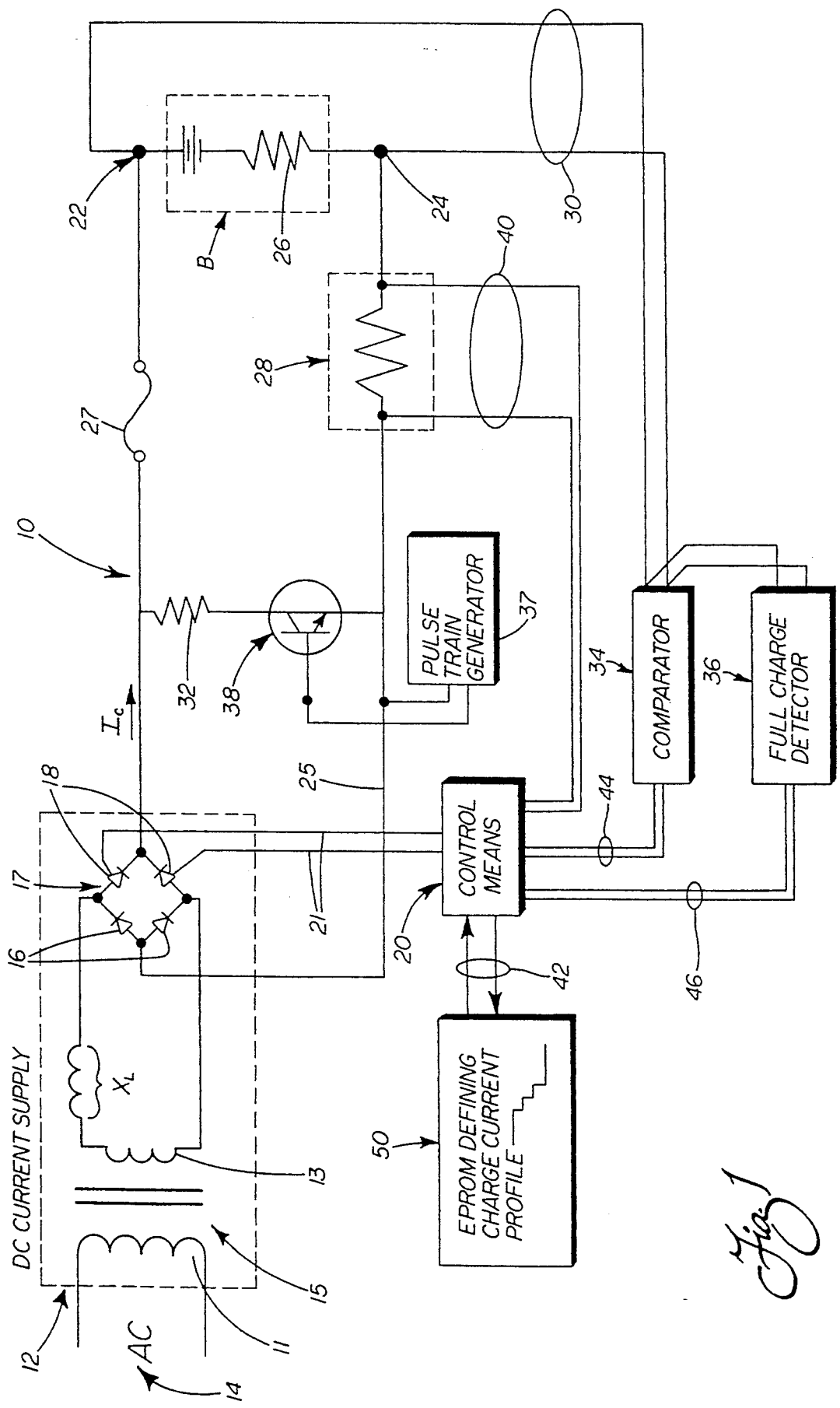

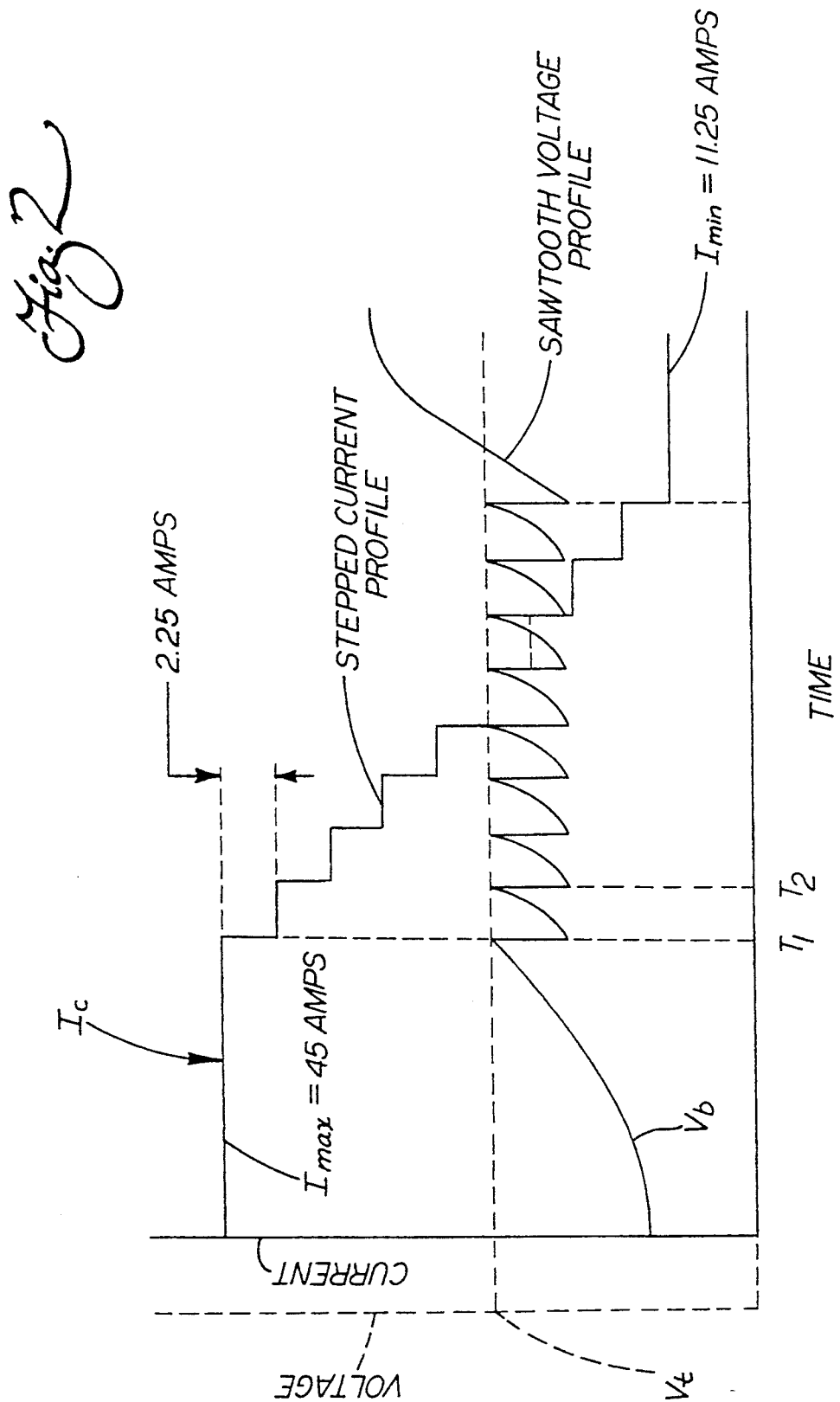

BATTERY CHARGING METHOD WITH STEPPED CURRENT PROFILE AND ASSOCIATED CHARGER

TECHNICAL FIELD

The present invention relates to an improved system for charging a battery, and more particularly to a method and associated or related charger circuit employing features that reduce the charging current applied to the battery in incremental steps, and concurrently control the voltage level, to minimize gassing.

BACKGROUND OF THE INVENTION

It is well known in the art that applying a controlled DC current to a lead acid, or similar chemical base, storage battery is a proven, efficient way of charging. That is, the application of charging current effects chemical changes in the battery so that chemical energy is stored. This energy is ultimately converted back to electrical energy when the battery is connected to supply electrical power to a machine or other device.

One detrimental effect of applying charging current in this type of battery is the formation of hydrogen bubbles in the battery electrolyte. This occurs when the application of charging current causes the battery voltage to increase to the gassing voltage, i.e. the voltage at which "gassing" or hydrogen bubble formation, begins in the battery electrolyte. As is known in the art, this condition, which results from a chemical reaction in the electrolyte, is usually indicative of an overcharging rate.

The bubbles tend to accumulate and adhere to the battery plates. The bubbles form a resistive layer on the plates, thereby causing an increase in the internal resistance of the battery and a proportional reduction in charging efficiency. More specifically, the increased resistance absorbs a portion of the charging current. As a result, the battery is heated internally by self-discharge, the current dropping precipitously across this artificial internal resistance. If excessive gassing continues, such that a heavy layer of hydrogen bubbles covers the plates, further application of charging current accelerates internal heating of the battery and the plates. Eventually, the plates overheat sufficiently to warp and short-out the battery.

Attempts have been made in the prior art to avoid the gassing problem. One of the more successful charging systems is disclosed in U.S. Pat. No. 4,740,739 to Quammen et. al, assigned to the present assignee. In this system, discharge pulses are intermittently applied with the charging current. More specifically, the negative current pulses are superimposed over the charging current to produce turbulence in the battery electrolyte. This turbulence serves to actively stir the electrolyte causing advantageous circulation of the electrolyte and scrubbing of the hydrogen bubbles from the battery plates, thereby avoiding the problem outlined above.

It should be appreciated that while this approach successfully prevents bubble accumulation on the battery plates, it does not prevent the formation of hydrogen bubbles. Specifically, even after the battery voltage reaches the gassing voltage, the level of charging current is not varied in this prior arrangement. This results in significant gassing, i.e. hydrogen bubble formation. Accordingly, it should be recognized that the approach disclosed in the Quammen et al patent effectively relieves the problem caused by gassing, but does not substantially limit gassing itself.

Past attempts to eliminate or greatly reduce gassing while still providing an effective charge in a reasonable period of time have not proven particularly successful.

U.S. Pat. No. 4,146,830 to Foster discloses an apparatus that repeatedly incrementally steps down charging current after the battery voltage reaches a target voltage. The target voltage is initially defined by the gassing voltage. However, each time the charging current is incrementally stepped down, the target voltage is also incrementally stepped up. As a result, after the initial charging increment, the target voltage level continues to increase and remains greater than the gassing voltage throughout a large portion of the charging cycle. In effect, the charging current continues to be incrementally reduced from the initial level, but the battery voltage is allowed to reach and surpass the gassing voltage to ever increasing levels. As a consequence, significant detrimental gassing still occurs, and this approach fails to successfully solve the problem.

Similarly, U.S. Pat. No. 4,052,656 to Lavell et al discloses an approach wherein charging current is gradually decreased as charging progresses. However, charging current is not significantly reduced after the gassing voltage is reached and, accordingly, charging current of relatively high level is still applied after the battery voltage reaches and exceeds the gassing voltage. Thus, use of this approach allows an even higher degree of detrimental gassing to occur, i.e. hydrogen gas bubbles are caused to form at an increasing rate, even after the current reduction in the earlier part of the cycle.

Finally, the IUI concept, described in U.S. Pat. No. 4,146,830 at column 1, lines 29–46, is a charging procedure that maintains battery voltage constant at its gassing voltage during charging current reduction. The control for such a system is very complex requiring very finely tuned regulation of the charging current to maintain the battery voltage at a constant voltage. Furthermore, an important IUI characteristic feature as described terminates charging of the battery by simply using a timer. It does not use a feedback device, such as a battery voltage detector, to sense when the battery is fully charged. Accordingly, in many instances overcharging occurs resulting in an inefficient waste of energy and possible damage to the battery, while in other situations the battery may not be completely charged resulting in poor battery performance.

SUMMARY OF THE INVENTION

Accordingly, it is the primary object of the present invention to provide an improved method and an associated apparatus for charging DC batteries that overcomes the shortcomings of the prior art identified above.

Another object of the present invention is to provide a method and associated apparatus for charging a battery that reduces the formation of detrimental hydrogen bubbles in the battery during charging.

A further object of the present invention is to provide a method and associated apparatus for supplying a controlled charging current to the battery that is incrementally stepped down as charging progresses and does not result in deleterious gassing.

Still another object of the present invention is to provide a method and associated apparatus for charging a DC battery wherein battery voltage is repeatedly increased up to, but does not substantially exceed its gassing voltage, thereby providing a saw-tooth profile while the charging current follows an incrementally stepped down profile.

Another object of the present invention is to provide a method and associated apparatus for charging a battery in accordance with the foregoing objectives, and in addition wherein the final phase of charging is completed by applying a minimum level constant charging current until the battery voltage increase rate substantially levels off.

Yet another object of the present invention is to provide a method and apparatus for charging a DC battery wherein the magnitude of applied charging current is reduced in incremental steps and the corresponding voltage is controlled to minimize gassing, while simultaneously discharge current pulses are applied and superimposed on the charging current to create a turbulence in the battery electrolyte to negate the minimal gassing that does occur.

Additional objects, advantages and other novel features of the invention will be set forth in part in the description that follows, and in part will become apparent to those skilled in the art upon examination of the following, or may be learned through the practice of the invention. The objects and the advantages of the invention may be realized and obtained by means of the instrumentalities and combinations particularly pointed out in the appended claims.

In order to achieve the foregoing and other objects, and in accordance with the purposes of the present invention as described herein, an improved battery charging method and associated apparatus are provided. The method and apparatus significantly reduce gassing in the battery, and the system thus essentially eliminates excessive formation and accumulation of hydrogen bubbles on the battery plates during the charging process.

The apparatus includes a source of DC current and related circuitry that applies the charging current to the battery to cause the desired chemical storage of energy. The charging circuit includes provisions for varying the level or magnitude of application of the charging current, and controlling the voltage at the same time. A control means sends a frequency signal to the charging current source that determines the most effective level at each increment of time. Thus, the control means ultimately regulates the overall level of charging current applied to the battery. This regulation is in accordance with a predefined profile of charging current/voltage over time, and thus provides a significant advance in the art. The current profile is defined and stored on an EPROM memory chip associated with the control means. The charging current, as defined by the profile, is incrementally stepped down during charging in generally equal amounts. Thus, this stepped down current profile forms an important first aspect of the invention.

In a further aspect of this invention, battery voltage is detected and compared to a target voltage. The comparing means provides an input signal to the control means such that the charging current is incrementally stepped down (as described above) each time the battery voltage essentially equals the upper target voltage. Each reduction in charging current causes a corresponding decrease in battery voltage, since less voltage is dropped across the battery's internal resistance ($V=IR$). This unique voltage control concept is thus coupled with the stepped reduction of charging current feature to give advantages not previously attainable.

Specifically, by defining the target voltage to be the gassing voltage of the battery, the battery voltage is advantageously maintained in the safe operational range below the gassing level, except for momentary intervals. Therefore virtually no gassing occurs, i.e. no appreciable level of hydrogen bubbles are formed in the battery electrolyte. The stepped, incremental reduction of the charging current automatically assures that the voltage applied to the battery is limited to an acceptable level. Thus, accumulation of bubbles on the battery plates, increases in internal resistance, and detrimental internal heating of the battery during all of the stages of charging are effectively prevented.

As a further aspect of this invention, the charging current, in addition to the novel aspect of being incrementally stepped down, is reduced to a selected minimum level toward the end of the charging cycle, and then is constantly held at that minimum level to complete the charging of the battery. This level is selected to be that current where battery voltage substantially levels off or stops rising, indicating that charging is complete. Utilizing this parameter as a guide results in another aspect of carrying out the charging cycle in a most efficient manner. To put it another way, this approach advantageously insures that the battery is fully charged while also preventing inadvertent overcharging and deleterious gassing.

In contrast to prior art approaches, the system of the present invention thus eliminates the gassing problem by controlling charging current to the extent that few or no gas bubbles are formed during normal operation. That is, the charging current is carefully controlled in a manner that prevents battery voltage from more than momentarily exceeding gassing voltage. However, as further insurance the system also includes the provision for applying the discharge current pulses superimposed over the charging current to create a turbulence that removes that minimal number of hydrogen bubbles that might be present.

Combining all of the features of the present invention thus serves in eliminating the formation and accumulation of the hydrogen bubbles on the battery plates and substantially improves the efficiency of charging. Specifically, the internal resistance of the battery is maintained at a lower level and, accordingly, less charging current is converted to heat. As a result more of the charging current is available to trigger the beneficial chemical reactions in the battery that can later be converted back to electrical current to do useful work.

Still other objects of the present invention will become readily apparent to those skilled in this art from the following description wherein there is shown and described a preferred embodiment of this invention, simply by way of illustration of one of the modes and alternative embodiments best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawings incorporated in and forming a part of the specification, illustrates several aspects of the present invention, and together with the description serve to explain the principles of the invention. In the drawings:

FIG. 1 is a schematic representation of the battery charging apparatus;

FIG. 2 is a graph illustrating the charging profile representing the incremental stepping down of charging current as the battery voltage repeatedly is limited to approximately the gassing or target voltage, the battery voltage thus being defined by a saw-tooth profile.

Reference will now be made in detail to the present preferred embodiment of the invention, an example of which is illustrated in the accompanying drawing.

DETAILED DESCRIPTION OF THE INVENTION

With reference now to FIG. 1, there is shown a circuit 10 including a DC charging current source 12 that outputs charging current $I_c$. The charging current source 12 includes an incoming AC power source 14 and a step-down transformer 15, having a primary winding 11 and a secondary winding 13. While FIG. 1 depicts the AC input power as single phase, it should be appreciated that this invention is not limited thereto but, instead, that this is merely descriptive of the preferred embodiment.

In FIG. 1, the symbol $X_L$, shown in series with the secondary winding 13, denotes the equivalent leakage reactance of the step-down transformer 15, as viewed from the secondary winding terminals. The specific choice of the step-down transformer 15 in relation to $X_L$ is explained in more detail in U.S. Pat. No. 4,740,739 to Quammen et al, the full disclosure of which is incorporated herein by reference.

A full wave bridge 17 is provided for rectifying and regulating the alternating current output from the secondary winding 13 into the DC charging current $I_c$. The full wave bridge 17 includes two diodes 16 and two silicon controlled rectifiers (SCR's) 18. Control means 20, such as an Intel 8051 microprocessor, sends an ON/OFF signal through lines 21 that triggers each SCR ON (i.e. into a conducting mode) for a period of time. The period of time at which the SCR's are triggered ON is changed to vary the magnitude of the charging current $I_c$.

Means for connecting a battery B that is being charged to the circuit 10 are provided. Specifically, a positive output terminal 22, for delivering the charging current $I_c$, is provided for connection with the positive battery terminal. Similarly, a negative output terminal 24, delivering voltage input through line 25 to diodes 16, is provided for connection with the negative battery terminal. The battery B includes an internal resistance 26 through which the charging current $I_c$ flows. The higher the internal resistance 26, the greater is the voltage drop across it ($V = IR$).

Means for limiting the current, shown as a fuse 27 in series with the battery B, is recommended. While not essential to the normal functioning of the battery B, this fuse 27 provides protection for both the circuit and the battery B during an emergency situation, such as a power spike or surge that might otherwise cause damage.

As indicated briefly above, the control means 20 regulates charging current $I_c$ by varying the triggering ON of the SCR's 18. The regulation of the charging current $I_c$ is in accordance with a charging current profile defined in a memory chip EPROM 50. More specifically, the EPROM 50 is a memory storage device that determines the level and profile of the charging current $I_c$ to apply to a particular battery B based on several parameters, including sensed battery voltage and charging current, as described in greater detail below.

The control means 20, in combination with the EPROM 50, is what determines the period of time of the ON signal being sent over lines 21 causing the appropriate level of charging current $I_c$ to be output, and applied through the circuit 10 to the battery B for maximum charging efficiency. The control means 20 communicates its input parameters to the EPROM 50, and receives the processed, output signals from the EPROM 50 over databus 42. Advantageously, relatively rapid charging, which is one important aspect of high efficiency, can be obtained by using the present inventive system, and this is accomplished without causing the deleterious "gassing" that is so prominent in the prior art arrangements.

More specifically, the control means 20 receives a signal from a comparator 34 that compares the battery voltage (entering along signal lines 30) to a target voltage, previously defined or preset in the comparator 34. The control means 20 uses the comparator signal to regulate the charging current $I_c$. That is, when the battery voltage equals the target voltage, the control means 20 triggers a selected incremental step down of the charging current $I_c$. In the preferred embodiment, the target voltage is the gassing voltage of the battery.

The control means 20 also receives a feedback signal from a charging current sensing means 28 through signal lines 40. In the preferred embodiment of the circuit shown in FIG. 1, the current sensing means 28 is a shunt resistor. The sensing of the charging current allows the control means 20 to regulate the charging current in accordance with the profile defined in the EPROM 50. Specifically, when the current sensing means 28 senses charging current at any level above a minimum value $I_{min}$, the charging current $I_c$ for the battery B is incrementally stepped down to a predetermined value. In contrast, when the charging current $I_c$ is at the preset or predetermined minimum value and the battery voltage equals the target voltage, the control means 20 changes its method of control. Specifically, under these conditions a step down of charging current $I_c$ is not triggered. Instead, constant charging current $I_c$ is applied at the minimum value $I_{min}$ until the battery voltage substantially levels off/stops rising at a preset or predetermined rate.

The control means 20 also receives a signal from a full charge detector 36 that monitors battery voltage rise over time. When it detects that battery voltage is increasing at a rate less than or equal to a predefined value, the control means terminates the application of charging current to the battery B, thus completing the charging cycle.

Means for applying discharge current pulses to the battery B is provided by operation of a pulse train generator 37, powered off of the step down transformer 15 having high leakage reactance $X_L$, and operating in a manner as described in the U.S. Pat. No. '739 U.S. Pat. No. 4,740,739, referred to above. A switching means 38, such as a transistor, and load resistor 32 are connected in series to each other and in parallel with the battery B. Means for triggering the discharge current is coordinated with the control means 20 so that the generated discharge current pulses are superimposed over the charging current $I_c$ during charging. The combined application of charging current and discharge current pulses to the battery B creates a constant turbulence in the battery. This turbulence serves to stir the electrolyte causing mixing that helps prevent stratification, e.g. variations in the specific gravity of the electrolyte at the upper and lower levels of the battery. Further, the turbulence peaks generated at the instant of each pulse, loosens and removes any stray hydrogen bubbles from the battery plates that form when battery voltage momentarily exceeds its gassing voltage. Keeping the battery plates thus free of significant accumulated hydrogen bubbles prevents the internal resistance 26 of the battery B from increasing. As such, the charging efficiency is further improved and, hence, power consumption and charging time is safely reduced.

Initially during charging, the charging current is selected to be at a relatively high level and constant, as shown in FIG. 2. In the preferred embodiment, the initial charging current is between 40 to 50 amps, and more preferably about 45 amps. A steep rise in battery voltage, represented by curve $V_b$ in FIG. 2, results from the application of this initial high level constant current. When the battery voltage increases and initially equals the target voltage $V_t$ at time $T_1$, the control means 20 in combination with the EPROM 50, sends the control signal triggering a new ON time of the SCR's 18, that in turn effects the incremental step reduction in charging current $I_c$.

In the preferred embodiment, the target voltage is selected as being approximately the gassing voltage of the battery B, and in a typical battery is calculated to be substantially 44.5 volts, or 2.37 volts/cell. Furthermore, the incremental step down of charging current in the preferred embodiment is between 1.0-5.0 amps and, more preferably, 2.25 amps. The graph in FIG. 2 shows control of the battery voltage $V_b$ as it drops at the same time due to the now reduced current $I_c$ flowing through the battery's internal resistance 26 (V=IR).

Charging current $I_c$ is applied at this new reduced level or magnitude until battery voltage $V_b$ again equals the target voltage $V_t$ at time $T_2$, which it will be remembered is at or near the gassing voltage. At that point, the current control means 20, in combination with EPROM 50, sends still another new ON time signal to the SCR's 18 effecting another incremental step down of charging current $I_c$. Battery voltage $V_b$ again drops due to the reduced charging current $I_c$ flowing through the internal resistance 26 battery B.

The charging current $I_c$ is incrementally stepped down in the above manner multiple times (e.g. 10-20), producing the stepped current profile, and generating a saw-tooth shaped voltage profile or curve, until the current $I_c$ is reduced to the minimum level $I_{min}$, shown in FIG. 2. In the preferred embodiment of this invention, the minimum level charging current $I_{min}$ is between 4 and 15 amps and more preferably substantially 11.25 amps. Other values could, of course, be utilized. The idea is to lower the current sufficiently so as to complete charging of the battery as quickly and efficiently as possible, but without producing significant gassing in this final charging phase, and thus continuing the objective of reducing the formation of hydrogen bubbles on the battery plates to an absolute minimum.

Specifically, the charging current is applied at this minimum level $I_{min}$, and the battery voltage $V_b$ increases to exceed the target voltage $V_t$ for a short time. As indicated above, the control means 20 functions in accordance with the EPROM 50 so that the battery voltage $V_b$ equalling the target voltage does not trigger a final incremental step down of charging current once the minimum level is reached. Instead, the battery voltage is monitored and its rate of increase calculated by the full charge detector 36. When the full charge detector 36 detects the rate to be less than 20 mV/minute, the detector sends a signal over lines 46 to the control means 20 that terminates the application of charging current $I_c$ and completes the charging cycle.

Of course, any time the battery voltage $V_b$ exceeds target voltage $V_t$, gassing momentarily occurs in the battery B and hydrogen bubbles are formed in the electrolyte. Using the present procedure, however, the gassing is substantially minimized. Further, it should be appreciated that the discharge current means including the pulse train generator 37, the transistor 38 and the resistor 32, as described above, is operative throughout the preferred charging cycle to superimpose discharge pulses that create the necessary turbulence in the electrolyte to maintain the battery plates free of potentially troublesome, stray hydrogen bubbles. As a result, the internal resistance 26 of the battery B does not significantly increase during the cycle. Overall, charging is, therefore, much more efficient and little or no heat is produced because there is no appreciable charging current $I_c$ absorbed by a large internal resistance, as has plagued previous charging circuit designs.

In summary, the present invention improves the efficiency of charging a DC battery by accurately controlling the charging current applied to the battery in a manner that minimizes the gassing that occurs in the battery electrolyte, while otherwise completing the charging process as rapidly as possible. This is beneficial because minimizing the gassing also minimizes the internal resistance of the battery. With the internal resistance increase thus being substantially nil, the entire charging current is available to assure that the chemical storage of energy in the battery is maximized. Charging efficiency is thus substantially improved.

The charging method and circuit 10 of the present invention also alleviates other problems associated with increased internal resistance. Since internal resistance is maintained at the lowest possible level, there is virtually no waste of charging current, and internal heating of the battery is held at the lowest possible level. Thus, there is no insulating coating of bubbles, or for that matter chemical compositions separated from the electrolyte by heat, deposited on the plates. The threat of warping the plates from overheating is virtually eliminated. Hence, battery service life is beneficially enhanced.

In this invention, charging current $I_c$ is applied such that battery voltage $V_b$ does not exceed its gassing voltage, except momentarily throughout the cycle as the target value is approached, and for a slightly longer duration in the latter stage of the charging cycle. Even with this feature of momentarily reaching the gassing voltage threshold, and including the longer period during the latter stage of the charging cycle being factored into the charging profile, there is no significant increase in internal resistance. To make sure this result is obtained, throughout the cycle, and particularly during the latter stage of charging when battery voltage is allowed to increase above the gassing voltage for the slightly longer period, discharge current pulses are applied to create the desired turbulence in the electrolyte. The small amount of hydrogen bubbles that do form are not allowed to adhere to the battery plates. In this way, full charge is rapidly achieved in an efficient manner while the problems associated with gassing are substantially eliminated.

The foregoing description of a preferred embodiment of the invention has been presented for purpose of illustration and description. It is not intended to be exhaustive or to limit the invention to the precise form disclosed. Obvious modifications or variations are possible in light of the above teachings. For example, the preferred embodiment illustrated is designed to charge a 36 volt battery pack, particularly adapted for use in powering golf carts. However, it will be clear that other battery packs, individual batteries, and even other types of batteries can be efficiently charged. Thus, the embodiment was chosen and described simply to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of charging a battery utilizing a variable charge current supply comprising the steps of:
    applying a charging current to the battery from said charge current supply;
    sensing battery voltage;
    reducing said charging current when said battery voltage equals a target voltage such that said reduction in said charging current causes a decrease in said battery voltage;
    maintaining said battery voltage not greater than said target voltage during said applying and reducing steps,
    repeating said applying and reducing steps to provide a stepped current profile until said charging current is reduced to a minimum value;
    applying said charging current at said minimum value after said reduction until the battery is at substantially full charge; and
    detecting said substantially full charge of the battery, and in response terminating application of said minimum value charging current.

2. The method of charging a battery as set forth in claim 1, wherein an initial current applied to said battery is substantially constant and between 40-50 amps.

3. The method of charging a battery as set forth in claim 2, wherein said initial charging current applied to said battery is approximately 45.0 amps.

4. The method of charging a battery as set forth in claim 1 wherein the step of reducing said charging current to define the stepped profile is performed in incremental steps causing accompanying decreases of said battery voltage, the battery voltage being generally defined by a saw-tooth profile.

5. The method of charging a battery as set forth in claim 4, wherein said incremental reducing steps of the stepped profile are between 1.0-5.0 amps.

6. The method of charging a battery as set forth in claim 5, wherein said incremental steps are each approximately 2.25 amps.

7. The method of charging a battery as set forth in claim 1, wherein said minimum value of said charging current is between 4-15 amps.

8. The method of charging a battery as set forth in claim 7, wherein said minimum charging current is approximately 11.25 amps.

9. The method of charging a battery as set forth in claim 1 wherein the step of detecting the full charge of the battery includes the step of monitoring the rate of increase of said battery voltage and determining when the rate is less than a lower set limit.

10. The method of charging a battery as set forth in claim 9, wherein said lower limit of said rate of increase of said battery voltage is substantially 20 mV/minute.

11. The method of charging a battery as set forth in claim 1 wherein said target voltage is substantially constant.

12. The method of charging a battery as set forth in claim 11 wherein said target voltage is the gassing voltage of the battery.

13. The method of charging a battery as set forth in claim 11, wherein said target voltage is approximately 44.5 volts.

14. The method of charging a battery as set forth in claim 1 further including the step of applying discharge current pulses through a series connected switching means and load resistor in parallel with said battery, said discharge current pulses being superimposed over said charging current to promote turbulence in electrolyte of the battery.

15. A method of charging a battery utilizing a variable charge current supply comprising the steps of:
    applying a charging current to the battery from said charge current supply;
    sensing battery voltage;
    reducing said charging current by between 1.0-5.0 amps when said battery voltage equals a target voltage between 40-50 volts such that said reduction in said charging current causes a decrease in said battery voltage;
    maintaining said battery voltage not greater than said target voltage during said applying and reducing steps,
    repeating the applying and reducing steps between 10-20 times to provide a stepped current profile until said charging current is fully reduced to a minimum value between 8-15 amps;
    applying said charging current at said minimum value after said reduction of the charging current until the battery is at substantially full charge;
    detecting said substantially full charge of the battery; and
    terminating application of said minimum value charging current in response to detecting said substantially full charge of said battery.

16. A battery charger for a DC battery comprising:
    means for applying a charging current to said battery;
    means for sensing battery voltage;
    means for sensing said charging current;
    means for comparing said battery voltage to a constant target voltage;
    means for detecting full charge of the battery;
    means to control said charging current in response to input signals from said charging current sensing means, said comparing means, and said full charge detection means; and
    means associated with said control means for defining a stepped profile for said charging current to provide a reduction by incremental steps in response to said battery voltage being substantially not greater than said target voltage;

said control means being operative upon sensing said charging current reaching a minimum level to allow continuation at said minimum level until said full charge detecting means detects said battery at said full charge.

17. A battery charger as set forth in claim 16 further including a primary AC voltage source; and said current applying means includes:

a step down transformer; and means for rectifying and regulating AC output from the step down transformer to produce DC charging current.

18. A battery charger as set forth in claim 17 wherein said rectifying and regulating means includes a full wave bridge rectifier with two diodes and two SCR's, said SCR's being connected to said control means to vary the charging current supplied to the battery.

19. A battery charger as set forth in claim 18 further including means for applying discharge current pulses, said means including in series switching means and a load resistor in parallel with said battery.

* * * * *